United States Patent
Zhang et al.

(10) Patent No.: US 10,764,125 B2
(45) Date of Patent: Sep. 1, 2020

(54) METHOD AND DEVICE FOR TRAINING MODEL IN DISTRIBUTED SYSTEM

(71) Applicant: HUAWEI TECHNOLOGIES CO., LTD., Shenzhen, Guangdong (CN)

(72) Inventors: Youhua Zhang, Shenzhen (CN); Dandan Tu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/044,757

(22) Filed: Jul. 25, 2018

(65) Prior Publication Data
US 2018/0331897 A1 Nov. 15, 2018

Related U.S. Application Data

(63) Continuation of application No. PCT/CN2017/071001, filed on Jan. 12, 2017.

(30) Foreign Application Priority Data

Jan. 30, 2016 (CN) .......................... 2016 1 0071145

(51) Int. Cl.
*G06F 15/177* (2006.01)
*H04L 12/24* (2006.01)
(Continued)

(52) U.S. Cl.
CPC ........ *H04L 41/0803* (2013.01); *G06F 9/5027* (2013.01); *G06N 20/00* (2019.01); *H04L 67/10* (2013.01); *G06F 2209/5017* (2013.01)

(58) Field of Classification Search
CPC ... H04L 41/0803; H04L 67/10; G06F 9/5027; G06F 2209/5017; G06N 20/00
See application file for complete search history.

(56) References Cited

U.S. PATENT DOCUMENTS

2014/0331036 A1* 11/2014 Thomas ................ G06F 9/4416 713/2
2015/0324690 A1 11/2015 Chilimbi et al.

FOREIGN PATENT DOCUMENTS

CN 101526960 A 9/2009
CN 102521056 A 6/2012
(Continued)

OTHER PUBLICATIONS

Dai et al.; Analysis of High-Performance Distributed ML at Scale through Parameter Server Consistency Models; 2015; School of Computer Science, Carnegie Mellon University; 9 pages. (Year: 2015).*

(Continued)

*Primary Examiner* — Richard G Keehn
(74) *Attorney, Agent, or Firm* — Conley Rose, P.C.

(57) ABSTRACT

A method and a device for training a model in a distributed system are disclosed, so as to reduce load of a master node (101) during model training. The method includes: receiving, by a parameter server (1022) in a first slave node (102), a training result sent by a parameter client (1021) in at least one slave node (102) in the distributed system, where the first slave node (102) is any slave node (102) in the distributed system, and a parameter client (1021) in each slave node (102) obtains a training result by executing a training task corresponding to a sub-model stored on a parameter server (1022) in the slave node (102); and updating, by the parameter server (1022) in the first slave node (102) based on the received training result, a sub-model stored on the parameter server in the first slave node.

18 Claims, 5 Drawing Sheets

(51) Int. Cl.
G06N 20/00 (2019.01)
G06F 9/50 (2006.01)
H04L 29/08 (2006.01)

(56) References Cited

FOREIGN PATENT DOCUMENTS

| CN | 102523249 | A | | 6/2012 | |
|----|-----------|---|---|--------|---|
| CN | 102880532 | A | * | 1/2013 | ........... H04L 41/145 |
| CN | 103745225 | A | | 4/2014 | |
| CN | 104714852 | A | | 6/2015 | |
| CN | 104731702 | A | * | 6/2015 | |
| CN | 105005911 | A | | 10/2015 | |

OTHER PUBLICATIONS

Richard Chirgwin; Microsoft to world: We've got open source machine learning too ; Nov. 17, 2015; The Register; 7 pages. (Year: 2015).*
Weng et al.; DeepChain: Auditable and Privacy-Preserving Deep Learning with Blockchain-based Incentive; Journal of Latex Class Files, vol. 14, No. 8, Aug. 2015; 18 pages. (Year: 2015).*
Microsoft; Distributed Machine Learning Toolkit Big Data, Big Model, Flexibility, Efficiency; Microsoft ; 2015; 3 pages. (Year: 2015).*
Dean et al.; Large Scale Distributed Systems for Training Neural Networks; Dec. 21, 2015; 144 pages. (Year: 2015).*
Li et al.; Scaling Distributed Machine Learning with the Parameter Server; Nov. 18, 2015; 4 pages. (Year: 2015).*
Huula; Review of "Scaling Distributed Machine Learning with the Parameter Server" ; Huu.La; Nov. 1, 2015; 4 pages. (Year: 2015).*
Jeffrey Dean et al: "Large Scale Distributed Deep Networks", Nov. 13, 2012, XP055534679, 9 pages.
Jeff Dean et al: "Large Scale Distributed Systems for Training Neural Networks". Dec. 21, 2015, XP055534687, 144 pages.
Kai Sheng Tai et al: "Distributed Training of Neural Network Language Models", Dec. 5, 2014, pp. 1-6, XP055534714.
Machine Translation and Abstract of Chinese Publication No. CN102523249, Jun. 27, 2012, 13 pages.
Machine Translation and Abstract of Chinese Publication No. CN105005911, Oct. 28, 2015, 21 pages.
Foreign Communication From a Counterpart Application, Chinese Application No. 201610071145.X, Chinese Office Action dated Jun. 3, 2019, 10 pages.
Koray Kavukcuoglu, Google AI Blog, DeepMind moves to TensorFlow, Apr. 29, 2016, from https://ai.googleblog.com/2016/04/deepmind-moves-to-tensorflow.html, 1 page.
Martin Abadi et al, TensorFlow: A system for large-scale machine learning. arXiv:1605.08695v2 [cs.DC] May 31, 2016, 18 pages.
Ho, Q., et al. "More Effective Distributed ML via a Stale Synchronous Parallel Parameter Server," Dec. 2013, 9 pages.

* cited by examiner

METHOD AND DEVICE FOR TRAINING MODEL IN DISTRIBUTED SYSTEM

CROSS-REFERENCE TO RELATED APPLICATIONS

This application is a continuation of International Application No. PCT/CN2017/071001, filed on Jan. 12, 2017, which claims priority to Chinese Patent Application No. 201610071145.X, filed on Jan. 30, 2016. The disclosures of the aforementioned applications are hereby incorporated by reference in their entireties.

TECHNICAL FIELD

The present invention relates to the field of machine learning technologies, and in particular, to a method and a device for training a model in a distributed system.

BACKGROUND

Model building is a key step in a data mining (DM) task in machine learning (ML). For example, in a universal parallel framework (Spark), during modeling, a master node (Master) may deliver a task to a plurality of slave nodes (Slave) for execution. Usually, a plurality of rounds of iterative computation needs to be implemented during task execution. After each round of iterative computation ends, each slave node needs to report an iterative computation result to the master node, the master node updates a model and delivers an updated parameter to the slave node, and the slave node starts to execute a next round of iterative computation.

Therefore, the master node needs to perform model updating and parameter delivering for a plurality of times. In a large-scale training scenario, a workload of the master node is relatively heavy. As a result, the master node tends to become a bottleneck of the entire training scenario.

SUMMARY

This application provides a method and a device for training a model in a distributed system, so as to reduce load of a master node during model training, and improve model training efficiency.

According to a first aspect, a method for training a model in a distributed system is provided. The distributed system includes a master node and a plurality of slave nodes, each slave node includes at least one parameter server and at least one parameter client, each parameter server stores a sub-model corresponding to the model, each parameter server stores a different sub-model, and the sub-model corresponding to the model is obtained by splitting the model. The method includes: receiving, by a parameter server in a first slave node, a training result sent by a parameter client in at least one slave node in the distributed system; and updating, by the parameter server in the first slave node based on the received training result, a sub-model stored on the parameter server in the first slave node. The first slave node is any slave node in the distributed system, and a parameter client in each slave node obtains a training result by executing a training task corresponding to a sub-model stored on a parameter server in the slave node.

The parameter server and the parameter client are disposed in the slave node in the distributed system. The master node may split a to-be-trained model, and store sub-models obtained through splitting on different parameter servers. The parameter client is configured to perform a training process, and the parameter server may update the sub-model. Then, a plurality of parameter servers may update the sub-models separately, which is equivalent to that a master model is updated. In this way, the master node only needs to split the model, and model updating work is shifted from the master node to the plurality of parameter servers, thereby implementing parallel model training, improving model training efficiency, and significantly reducing load of the master node.

With reference to the first aspect, in a first possible implementation of the first aspect, after the updating, based on the received training result, a sub-model stored on the parameter server in the first slave node, the parameter server in the first slave node may further send, to the parameter client in the at least one slave node in the distributed system, a parameter obtained after the stored sub-model is updated. The parameter is used by the parameter client in the at least one slave node to perform subsequent training on a sub-model stored on a parameter server in the at least one slave node.

The parameter server in the first slave node may obtain some parameters after updating the stored sub-model, and the parameter server may send the obtained parameters to the parameter client in the at least one slave node. In this way, these parameter clients may continue to perform training on the model based on these parameters, thereby ensuring that each parameter client can perform normal training on the model, and avoiding an error.

With reference to the first aspect or the first possible implementation of the first aspect, in a second possible implementation of the first aspect, the training result received by the parameter server in the first slave node includes a first training result, and the first training result is obtained by a parameter client in the first slave node by performing n rounds of training on the sub-model stored on the parameter server in the first slave node, where n is a positive integer.

Some training results may not be very important to an overall situation, or these training results may not be required to update a sub-model on a parameter server in each round of iteration. Therefore, for such a type of training result, the parameter client may send a training result obtained after a plurality of iterations to the parameter server, thereby reducing an amount of to-be-transmitted data, saving transmission resources, and improving training efficiency.

With reference to the first aspect or the first or second possible implementation of the first aspect, in a third possible implementation of the first aspect, the method further includes: when the parameter client in the first slave node completes a $K^{th}$ round of training, and the parameter client in the first slave node determines that a difference between a sequence number of a current round of training being performed by a parameter client with a lowest training speed in the distributed system and K is greater than a preset difference, switching, by the first parameter client, from a working state to a waiting state, so as to wait while the parameter client with the lowest training speed performs training; and when the difference between the sequence number of the current round of training being performed by the parameter client with the lowest training speed and K is less than or equal to the preset difference, switching, by the parameter client in the first slave node, from the waiting state to the working state, where k is a positive integer.

This ensures as far as possible that a training round quantity difference between the parameter clients is not excessively large, so that a finally obtained model is converged, and a fastest parameter client can continue subsequent work, without having to wait until the slowest parameter client completely catches up, thereby saving time and improving training efficiency. In addition, this also ensures as far as possible that the parameter client with a high speed maintains the training speed, and minimizes impact on performance of the parameter client.

With reference to the third possible implementation of the first aspect, in a fourth possible implementation of the first aspect, the switching, by the parameter client in the first slave node, from the waiting state to the working state may be starting, by the parameter client in the first slave node, a $(K+1)^{th}$ round of training; or sending, by the parameter client in the first slave node, a training result obtained through the $K^{th}$ round of training to the parameter server in the first slave node, where the training result is used by the parameter server in the first slave node to update the sub-model stored on the parameter server in the first slave node.

The parameter client in the first slave node may continue to perform a next round of training, that is, the parameter client in the first slave node may not need to send a training result obtained in each round to the parameter server, to reduce an amount of to-be-transmitted data. Alternatively, the parameter client in the first slave node may send an obtained training result to the parameter server, so that the sub-model stored on the parameter server is updated in a timely manner. How the parameter client in the first slave node operates may be preset by the distributed system, or may be set by the parameter client depending on a situation. The implementation is relatively flexible.

According to a second aspect, a second method for training a model in a distributed system is provided. The distributed system includes a master node and a plurality of slave nodes, each slave node includes at least one parameter server and at least one parameter client, each parameter server stores a sub-model corresponding to the model, each parameter server stores a different sub-model, and the sub-model corresponding to the model is obtained by splitting the model by the master node. The method includes: assigning, by the master node, an atomic task used to train the model to at least one process; and creating, by the master node, a task management process. The task management process is used to manage the atomic task in the at least one process. Each sub-model of the model is corresponding to at least one training task, and one training task includes at least one atomic task.

The task management process is set to perform centralized scheduling on atomic tasks, so that each process works under scheduling, and a process in which a task is first completed does not steal an atomic task from another process, thereby effectively resolving an inter-process preemption problem, reducing performance overheads, and avoiding a deadlock risk.

With reference to the second aspect, in a first possible implementation of the second aspect, the method may further include: receiving, by the master node by using the task management process, a request message sent by a first atomic task, where the request message is used to request to execute the first atomic task; and assigning, by the master node by using the task management process, first execution time to the first atomic task, and assigning, by using the task management process, the first atomic task to a first slave node for processing, where the first atomic task is any one of the atomic task used to train the model, and the first execution time is pre-estimated by the master node based on execution time of the first atomic task.

The master node may assign execution time to an atomic task through task management. Basically, the slave node executes the atomic task based on the assigned execution time, and the master node also knows the execution time assigned to each atomic task. Therefore, before the execution time of the atomic task expires, the master node may not assign a new atomic task to a process occupied by the atomic task, thereby preventing a plurality of tasks from preempting a same process, further reducing performance overheads, and avoiding a deadlock risk.

According to a third aspect, a first computing node in a distributed system is provided, including a parameter server and a parameter client. The parameter server in the computing node stores one or more sub-models of a to-be-trained model, the sub-model of the to-be-trained model is obtained by splitting the to-be-trained model, and the sub-model stored on the parameter server is different from a sub-model stored on a parameter server in another computing node in the distributed system. The parameter client in the computing node is configured to execute a training task corresponding to the one or more sub-models stored on the parameter server in the computing node, to obtain a training result of each sub-model, where each sub-model is corresponding to at least one training task. The parameter server in the computing node is configured to: receive a training result sent by a parameter client in at least one computing node in the distributed system, and update the stored sub-model based on the received training result.

With reference to the third aspect, in a first possible implementation of the third aspect, after updating, based on the received training result, the sub-model stored on the parameter server in the computing node, the parameter server in the computing node may further send, to the parameter client in the at least one computing node in the distributed system, a parameter obtained after the stored sub-model is updated. The parameter is used by the parameter client in the at least one computing node to perform subsequent training on a sub-model stored on a parameter server in the at least one computing node.

With reference to the third aspect or the first possible implementation of the third aspect, in a second possible implementation of the third aspect, the training result received by the parameter server in the computing node includes a first training result, and the first training result is obtained by a parameter client in the computing node by performing n rounds of training on the sub-model stored on the parameter server in the computing node, where n is a positive integer.

With reference to the third aspect or the first or second possible implementation of the third aspect, in a third possible implementation of the third aspect, the parameter client in the computing node is further configured to: when the parameter client completes a $K^{th}$ round of training, and determines that a difference between a sequence number of a current round of training being performed by a parameter client with a lowest training speed in the distributed system and K is greater than a preset difference, switch from a working state to a waiting state, so as to wait while the parameter client with the lowest training speed performs training; and when the difference between the sequence number of the current round of training being performed by the parameter client with the lowest training speed and K is less than or equal to the preset difference, switch from the waiting state to the working state, where K is a positive integer.

With reference to the third possible implementation of the third aspect, in a fourth possible implementation of the third aspect, the parameter client in the computing node may be further configured to start a $(K+1)^{th}$ round of training, or may be further configured to send a training result obtained through the $K^{th}$ round of training to the parameter server in the computing node. The training result is used by the parameter server in the computing node to update the sub-model stored on the parameter server in the computing node.

According to a fourth aspect, an embodiment of the present invention further provides another computing node in a distributed system. The computing node may be implemented by using a physical host, and the physical host includes two parts: a hardware device and a software device. A set of hardware devices is referred to as a hardware layer, and the software device includes a host machine running on the hardware layer, and a virtual machine running on the host machine. The virtual machine uses computation and storage resources provided by the hardware layer to implement functions of the parameter server and the parameter client described in any one of the foregoing aspects or any implementation of any aspect. A parameter server, a parameter client, and the like included in the computing node may be implemented by using virtual machines in the computing node.

According to a fifth aspect, a third computing node in a distributed system is provided, including a memory and a processor. The memory is configured to store instructions, and the processor is configured to execute the instructions stored in the memory, so as to implement functions of the parameter server and the parameter client described in any one of the foregoing aspects or any implementation of any aspect.

According to a sixth aspect, an embodiment of the present invention further provides a computer readable storage medium, configured to store code or an executable program for implementing functions of the parameter server and the parameter client described in any one of the foregoing aspects or any implementation of any aspect. In the embodiments of the present invention, model updating work is shifted from the master node to a plurality of parameter servers, thereby reducing load of the master node. Each parameter server may update only some sub-models, thereby implementing parallel model training, well preventing the master node from becoming a bottleneck of an entire training process, and improving model training efficiency.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are some but not all of the embodiments of the present invention.

It should be further understood that although the terms such as "first" and "second" may be used to describe various components in this specification, these terms are only used to distinguish these elements from each other. "A plurality" in this embodiment of the present invention refers to two or more. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

Figure 1A:
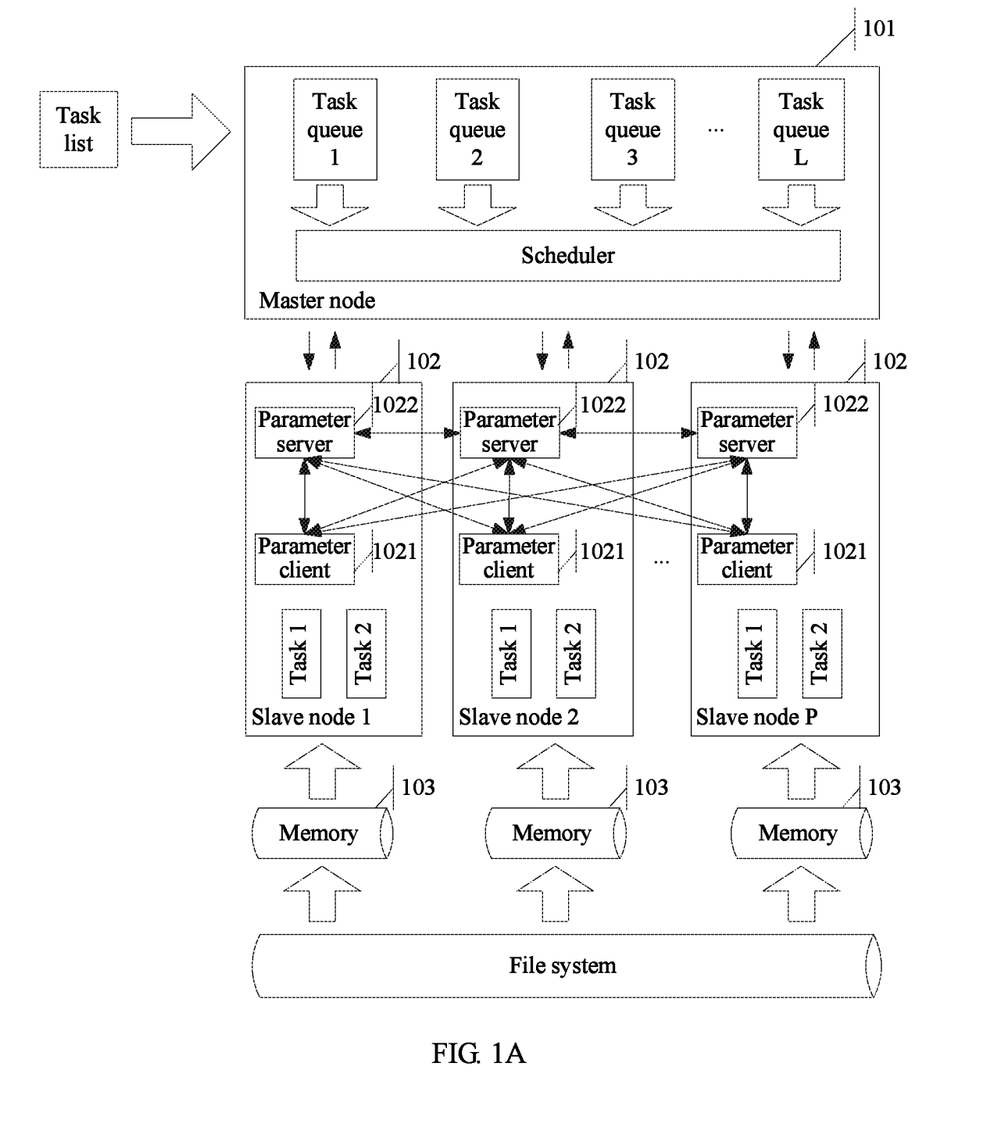
FIG. 1A and FIG. 1B are architectural diagrams of two distributed systems according to an embodiment of the present invention.

FIG. 1A shows a possible architecture of a distributed system according to an embodiment of the present invention.

In FIG. 1A, the distributed system includes a master node 101 and P slave nodes 102 (P in FIG. 1A is greater than or equal to 3), where P is a positive integer. The master node 101 may be implemented by using a physical machine, or may be implemented by using a virtual machine. Similarly, the slave node 102 may be implemented by using a physical machine, or may be implemented by using a virtual machine. The master node 101 maintains one or more task queues. In FIG. 1A, for example, L task queues are maintained (L in FIG. 1A is greater than or equal to 3). The master node 101 receives a task list submitted by a user by using a client (the client herein may be a device such as a server or a personal computer), and assigns tasks included in the received task list to the task queues. The master node 101 may include a scheduler. The scheduler is configured to schedule the tasks in the task queues, to distribute the tasks to the slave nodes 102, thereby implementing parallel processing of the tasks.

The distributed system may be configured to perform model training, and one model may be corresponding to at least one training task. It may be understood that after a training task corresponding to one model is completed, training of the model is completed. Generally, a quantity of training tasks for one model is the same as a quantity of hyperparameter groups of the model. The hyperparameter, also referred to as the hyper-parameter, is a framework parameter in a machine learning model, for example, a quantity of clusters in a clustering method, or a quantity of topics in a topic model. For example, if a model 1 has two groups of hyperparameters, it may be determined that the model 1 is corresponding to two training tasks. After the two training tasks are completed, a round of training is completed for the model 1. In this case, when the master node 101 delivers the training tasks to the slave nodes 102, the master node 101 may deliver the two training tasks to slave nodes 1 to 3. When the slave nodes 1 to 3 execute the two training tasks (the slave nodes 1 to 3 may separately execute different parts of the two training tasks), a plurality of iterations may be performed. A round of iteration may be considered as one training process. After the slave nodes 1 to 3 all complete iteration, it may be considered that the two training tasks are completed. Then, if the training tasks included in the task list are corresponding to a plurality of models, the master node 101 may deliver the training tasks corresponding to the plurality of models to the slave nodes 102 for execution. In this way, parallel training is implemented for the models.

The slave node 102 may include a parameter client 1021, and the parameter client 1021 may execute a training task assigned by the master node 101, for example, may perform a plurality of rounds of iterative computation based on training data. Parameter clients 1021 in the slave nodes 102 may execute training tasks in parallel after receiving the training tasks assigned by the master node 101. If these training tasks belong to different models, parallel training is implemented for the models. For ease of description, a to-be-trained model is hereinafter referred to as a master model. In the embodiments of the present invention, one master model may be split into a plurality of sub-models. The sub-models obtained after splitting may be stored on parameter servers 1022 in the slave nodes, and a training task corresponding to each sub-model is executed by the parameter client 1021 in each slave node 102.

In an embodiment, as shown in FIG. 1A, one parameter client 1021 and one parameter server 1022 may be deployed in one slave node 102. Further, in an embodiment, if the slave node 102 is a physical machine, the parameter client 1021 and the parameter server 1022 each may be a virtual machine or a process running on the slave node 102. Optionally, all parameter servers 1022 in the system may communicate with each other, and each parameter server 1022 may perform weighing based on sub-models stored on all the parameter servers 1022, to better update the local sub-models.

Each parameter server 1022 may store a different sub-model, and the sub-model stored on each parameter server 1022 in the system nay be corresponding to one model, or may be corresponding to a plurality of models. For example, if each parameter server 1022 may store only a sub-model corresponding to one master model (for example, a master model 1), the complete master model 1 may be obtained by gathering all sub-models corresponding to the master model 1 in all the parameter servers 1022; or, for example, if each parameter server 1022 may store sub-models corresponding to a master model 1 and a master model 2, the complete master model 1 may be obtained by gathering all sub-models corresponding to the master model 1 in all the parameter servers 1022, and the complete master model 2 may be obtained by gathering all sub-models corresponding to the master model 2 in all the parameter servers 1022. For example, if the master node 101 delivers the training tasks corresponding to the plurality of models to the slave nodes 102 for execution, the master node 101 may pre-configure the sub-models corresponding to the plurality of models for all the parameter servers 1022. In other words, during model training, a model may be trained independently, or a plurality of models may be trained at the same time, to implement parallel training for the models and improve training efficiency of the system.

After executing the training task, that is, after performing model training, the parameter client 1021 may obtain a training result, or an iterative computation result. The parameter client 1021 may send the obtained iterative computation result to a corresponding parameter server 1022. The parameter server 1022 updates, based on the iterative computation result, a sub-model stored on the parameter server 1022, and sends an update result (including, for example, an updated model parameter) to the parameter client 1021, so that the parameter client 1021 continues to perform a subsequent training process.

The distributed system may include a plurality of parameter servers 1022 and a plurality of parameter clients 1021 (a quantity of the parameter servers 1022 and a quantity of the parameter clients 1021 may be the same or different). In this case, the master node 101 may first set a correspondence between a parameter server 1022 and a parameter client 1021. One parameter server 1022 may be corresponding to at least one parameter client 1021, and similarly, one parameter client 1021 may be corresponding to at least one parameter server 1022. A parameter server 1022 and a parameter client 1021 that are corresponding to each other may be located in one slave node 102, or may be located in different slave nodes 102. The parameter server 1022 and the parameter client 1021 that are corresponding to each other may communicate with each other. For example, assuming that a first parameter server has a correspondence with a first parameter client and a second parameter client, if the first parameter server updates a local sub-model 1, the first parameter server may separately send, to the first parameter client and the second parameter client, a parameter obtained after the sub-model 1 is updated. For another example, assuming that a first parameter client has a correspondence with a first parameter server, a second parameter server, and a third parameter server, after performing a round of training, the first parameter client may send an obtained training result to at least one of the first parameter server, the second parameter server, or the third parameter server.

The correspondence between the parameter server 1022 and the parameter client 1021 may be stored in any one or more of the master node 101, the parameter server 1022, and the parameter client 1021. For example, if the system includes a first parameter server, a second parameter server, and a third parameter server, and includes a first parameter client, a second parameter client, a third parameter client, and a fourth parameter client, the master node 101 may store correspondences between all parameter servers 1022 and all parameter clients 1021. For the first parameter server, the first parameter server may store the correspondences between all the parameter servers 1022 and all the parameter clients 1021, or only store a correspondence of the first parameter server, for example, a correspondence between the first parameter server and the first parameter client, and a correspondence between the first parameter server and the second parameter client. For the first parameter client, the first parameter client may store the correspondences between all the parameter servers 1022 and all the parameter clients 1021, or only store a correspondence of the first parameter client, for example, a correspondence between the first parameter client and the first parameter server, a correspondence between the first parameter client and the second parameter server, and a correspondence between the first parameter client and the third parameter server.

When each slave node 102 performs training, the slave node 102 needs to perform training based on known data, and a memory 103 may be configured for each slave node 102 (certainly, a same memory 103 may be configured for a plurality of slave nodes 102, and this is not limited in this embodiment of the present invention). The memory 103 may be configured to store data required by the slave node 102 to perform training. The slave node 102 may directly obtain data from the corresponding memory 103 to perform training, and the data in the memory 103 may come from a file system. For example, on a Spark platform, the memory 103 may be implemented by using resilient distributed datasets (RDDs), and data in each RDD may come from a Hadoop distributed file system (HDFS).

Figure 1B:
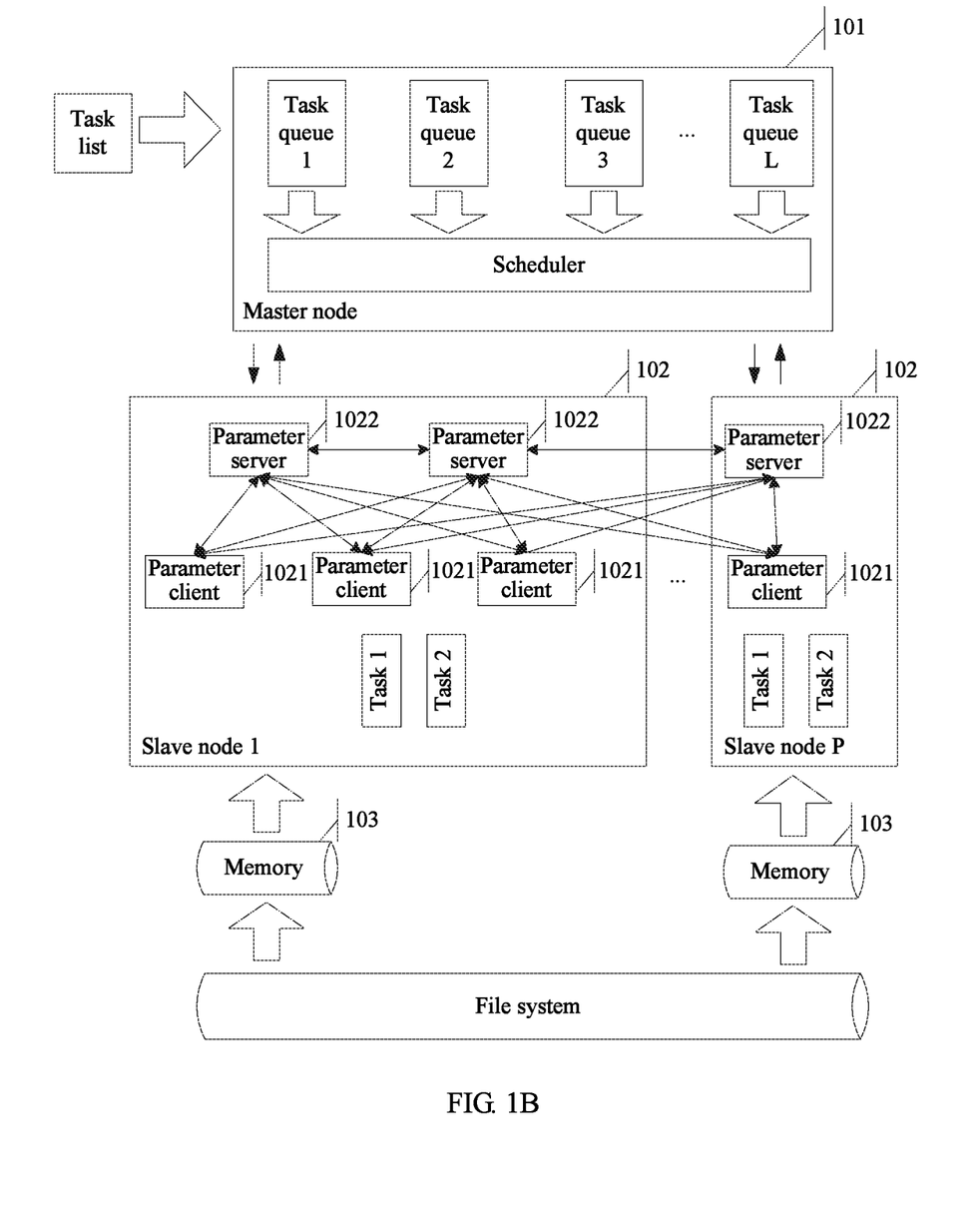

Optionally, referring to FIG. 1B, FIG. 1B is another possible architectural diagram of a distributed system according to an embodiment of the present invention.

P in FIG. 1B is greater than or equal to 2. In FIG. 1B, that L task queues are maintained is also used as an example, and L is greater than or equal to 3. A main difference between FIG. 1B and FIG. 1A lies in a quantity of parameter servers 1022 and a quantity of parameter clients 1021 distributed in the slave node 102. In FIG. 1B, a plurality of parameter clients 1021 and a plurality of parameter servers 1022 may be deployed in the slave node 102. Although a configuration manner of the parameter server 1022 and the parameter client 1021 in FIG. 1B is different from that in FIG. 1A, the distributed system shown in FIG. 1B works in a same way as the distributed system shown in FIG. 1A. Details are not described herein again.

The following describes a method provided in an embodiment of the present invention with reference to the accompanying drawings. In the following descriptions, the first parameter server may be any parameter server 1022 in FIG. 1A or FIG. 1B, a first slave node is a slave node in which the first parameter server is located, and the first parameter client may be any parameter client 1021 in FIG. 1A or FIG. 1B. Methods in FIG. 2 to FIG. 4 to be described in the following may be all based on the distributed system in FIG. 1A or FIG. 1B.

Figure 2:
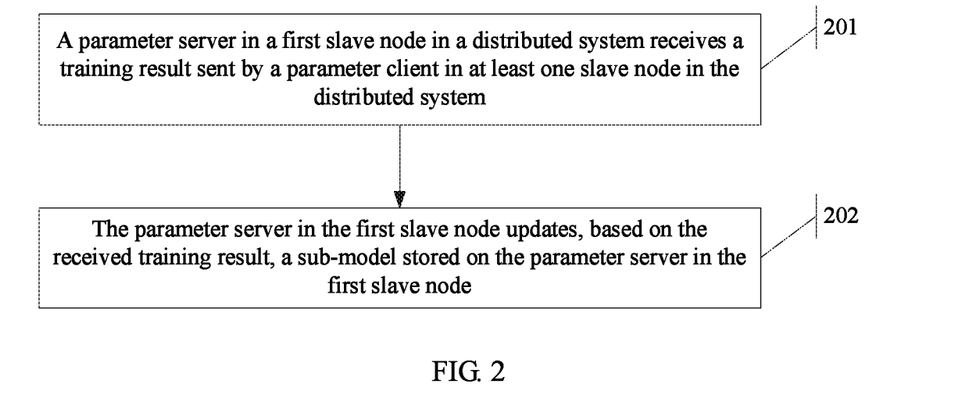
FIG. 2 is a flowchart of a first model training method according to an embodiment of the present invention.

Referring to FIG. 2, an embodiment of the present invention provides a model training method. The method may be implemented by using the distributed system shown in FIG. 1A or FIG. 1B, and a procedure for the method is described below.

Step 201: A parameter server in a first slave node receives a training result sent by a parameter client in at least one slave node 102 in the distributed system.

Step 202: The parameter server in the first slave node updates, based on the received training result, a sub-model stored on the parameter server in the first slave node.

The first slave node is any slave node 102 in the distributed system, and a parameter client in each slave node 102 obtains a training result by executing a training task corresponding to a sub-model stored on a parameter server in the slave node 102.

The model mentioned in FIG. 2 may be referred to as a master model. For example, one master model may be split to obtain a plurality of sub-models, and a quantity of the obtained sub-models may be, for example, the same as a quantity of parameter servers in the distributed system. In this case, each sub-model obtained after splitting may be assigned to one parameter server. In other words, all parameter servers participate in a master model training process, and each parameter server stores a different sub-model of the same master model. One master model is used as an example in FIG. 2. However, a plurality of master models may be trained at the same time in the distributed system in this embodiment of the present invention. For example, if N master models are split, for one parameter server in the system, N sub-models may be stored, and the N sub-models are sub-models obtained by splitting the N master models. For ease of description, a parameter server in the first slave node is hereinafter referred to as a first parameter server. Certainly, the first slave node may include a plurality of parameter servers. If the plurality of parameter servers are deployed in the first slave node, a first parameter server in the plurality of parameter servers is used as an example.

Optionally, a parameter client in a slave node needs to perform training on a sub-model stored on a parameter server in the slave node, and may also perform training on a sub-model stored on a parameter server in another slave node. This is not limited in this embodiment of the present invention.

For example, if the first parameter server has a correspondence with a parameter client in the at least one slave node in the distributed system, it may be considered that these parameter clients all participate in training performed on a sub-model stored on the first parameter server. After these parameter clients perform a round of iterative computation, all or some of the parameter clients send a result (which is referred to as a training result in the embodiments of the present invention) obtained through iterative computation to the first parameter server. After receiving a training result sent by each parameter client, the first parameter server may update, based on the training result, a sub-model corresponding to the first parameter server, for example, the first parameter server may update N stored sub-models based on the obtained training result. The N sub-models may be all sub-models stored on the first parameter server, or may be some of the sub-models stored on the first parameter server.

Optionally, after the first parameter server updates the N sub-models, some parameters may be obtained, and the first parameter server may send the obtained parameters to one or more parameter clients. For example, the first parameter server may send the obtained parameters to each parameter client sending the training result to the first parameter server, or to all or some of parameter clients having a correspondence with the first parameter server, or to all parameter clients participating in training on the N sub-models in the distributed system. After receiving the parameters sent by the first parameter server, the parameter client may perform a subsequent training process based on these parameters. For example, for a parameter client, in the parameter clients, located in the first slave node, after receiving the parameters sent by the first parameter server, the parameter client may update, based on the received parameters, the sub-model stored on the first parameter server. Optionally, if the parameter client also participates in training on a sub-model stored on a parameter server in another slave node, the parameter client may further update, based on the received parameters, the sub-model stored on the corresponding parameter server.

In this embodiment of the present invention, the parameter server is responsible for updating the sub-model, and the master node does not need to perform model updating in each round, thereby significantly reducing load of the master node. In addition, if the master node performs model updating, after performing model updating in each round, the master node further needs to deliver, to each slave node, a parameter obtained after updating. In a large-scale training scenario, a large quantity of parameters may be generated in each round of updating, and the master node and the slave node need to perform frequent communication processes with a large amount of data. Consequently, congestion tends to occur, and system performance is impaired. However, in this embodiment of the present invention, the parameter server and the parameter client may be understood as logical entities in the slave node.

Optionally, some training results may not be very important to an overall situation, or these training results may not be required to update a sub-model on a parameter server in each round of iteration. Therefore, for such a type of training result, the parameter client may send a training result obtained after a plurality of iterations to the parameter server. For example, the training result received by the first parameter server includes a training result (for example, referred to as a first training result) sent by the first parameter client, and the first training result may be obtained by the first parameter client by performing n rounds of training on the sub-model stored on the first parameter server, or may be obtained by the first parameter client by performing n rounds of training on sub-models stored on the plurality of parameter servers including the first parameter server, where n is a positive integer. In other words, the first training result may be a result obtained after one round of iterative computation, or may be a result obtained after a plurality of rounds of iterative computation. The first parameter client may be, for example, any parameter client in the first slave node, or any parameter client in another slave node in the distributed system. In this way, for non-critical data, the parameter client may send a training result to the parameter server after a plurality of iterations, thereby reducing an amount of to-be-transmitted data, saving transmission resources, and improving training efficiency. Certainly, specifically, the master node, a parameter server, or a parameter client may pre-configure which data may be processed in this way, or which training tasks executed by a parameter client allow a training result to be reported after a plurality of iterations.

For example, the first parameter client and the second parameter client in the distributed system jointly train a master model 1, and the master model 1 is corresponding to a training task 1 and a training task 2. The first parameter client executes a part of the training task 1 and a part of the training task 2, and the second parameter client executes a remaining part of the training task 1 and a remaining part of the training task 2. Then, both the first parameter client and the second parameter client may perform a plurality of iterative processes, that is, perform a plurality of training processes (a quantity of iterations required to be performed by the first parameter client and a quantity of iterations required to be performed by the second parameter client may be the same or different). After completing a last round of iteration, the first parameter client and the second parameter client each may report a training result to a parameter server. For example, the first parameter client reports a training result to the first parameter server, and the second parameter client reports a training result to a second parameter server. The first parameter server updates a stored sub-model 1 of the master model 1, and the second parameter server updates a stored sub-model 2 of the master model 1 (during updating, the first parameter server may obtain information about the sub-model 2 in the second parameter server, so as to perform weighing and then update the sub-model 1, and this is the same for the second parameter server). This is equivalent to that the master model 1 is updated, that is, training is implemented for the master model 1. If the trained master model 1 needs to be sent to a user, the first parameter server and the second parameter server may respectively send the sub-model 1 and the sub-model 2 to a master node 101, and the master node 101 integrates the sub-model 1 and the sub-model 2, and sends a model obtained through integration to the user.

When the parameter client performs training on a model, a plurality of iterations may need to be performed, that is, a plurality of training processes may need to be performed. Depending on different parameter client performance, different executed training tasks, and the like, each parameter client may have a different execution speed, for example, some parameter clients have a high speed, while some parameter clients have a low speed. Because synchronization is required in a current technology, a parameter client with a higher execution speed may need to stop and wait for a parameter client with a lower execution speed, for example, may wait until all parameter clients are in lockstep, and then all parameter clients together perform a subsequent process. Obviously, this is time-consuming, and also affects performance of the parameter client with a higher speed.

To resolve these problems, it is put forward in this embodiment of the present invention that: When a parameter client in the first slave node (for example, the first parameter client) completes a $K^{th}$ round of training, the first parameter client determines a difference between a sequence number of a current round of training being performed by a parameter client with a lowest training speed (for example, referred to as the second parameter client) in the distributed system and K; if the difference is greater than a preset difference, the first parameter client may switch from a working state to a waiting state, so as to wait while the second parameter client performs training; and when the difference between the sequence number of the current round of training being performed by the second parameter client and K is less than or equal to the preset difference, the first parameter client switches from the waiting state to the working state, where K is a positive integer. The second parameter client and the first parameter client may be located in a same slave node, for example, both located in the first slave node, or may be located in different slave nodes.

For example, each parameter client may maintain a total quantity of rounds (which may also be referred to as times) of iteration that needs to be performed, or may maintain a sequence number of a current round of iterative computation being performed. For example, a parameter client needs to perform a total of 10 rounds of iteration, and a third round is being performed currently. Then, when the first parameter client completes a round of training, for example, completes a $K^{th}$ round of training, the first parameter client may determine a sequence number of a current round of training being performed by another parameter client. For example, the first parameter client may learn of a training status of another parameter client by using a parameter server, or may learn of a training status of another parameter client by directly communicating with the another parameter client. For example, if the system further includes the second parameter client, a third parameter client, and a fourth parameter client, the second parameter client is performing a second round of training, the third parameter client is performing a third round of training, and the fourth parameter client is performing a fifth round of training, and K=8, the first parameter client determines that the second parameter client is a parameter client with a lowest training speed in the system. A maximum round quantity difference, for example, referred to as the preset difference, may be preset in each parameter client, and preset differences set in different parameter clients may be the same or different. For example, for the first parameter server, the preset difference is 4, that is, a training quantity difference between the first parameter client and the parameter client with the lowest training speed in the system needs to be less than or equal to 4. In this case, because the training round quantity difference between the first parameter client and the second parameter client is 6, which is obviously greater than 4, the first parameter client may stop working, and start to wait while the second parameter client performs training. When the difference between the sequence number of a current round of training performed by the second parameter client and K is less than or equal to 4, the first parameter client continues to work. This ensures as far as possible that a training round quantity difference between the parameter clients is not excessively large, so that a finally obtained model is converged, and a fastest parameter client can continue subsequent work, without having to wait until the slowest parameter client completely catches up, thereby saving time and improving training efficiency. In addition, this also ensures as far as possible that the parameter client with a high speed maintains the training speed, and minimizes impact on performance of the parameter client.

Optionally, after resuming to work, the first parameter client may continue to perform a next round of training, or may send a training result obtained through the $K^{th}$ round of training to a corresponding parameter server, for example, may send the training result obtained through the $K^{th}$ round of training to a parameter server (including the first parameter server) in at least one slave node 102 in the distributed system, or may send the training result obtained through the $K^{th}$ round of training to the first parameter server. Specific operations may be set depending on a requirement of the system.

In descriptions of FIG. 1A and FIG. 1B, the master node 101 may receive a task list, and may separately assign training tasks in the task list to the slave nodes 102 for execution. The following provides a second model training method in a distributed system, to describe how the master node 102 assigns the training tasks to the slave nodes 102.

Figure 3:
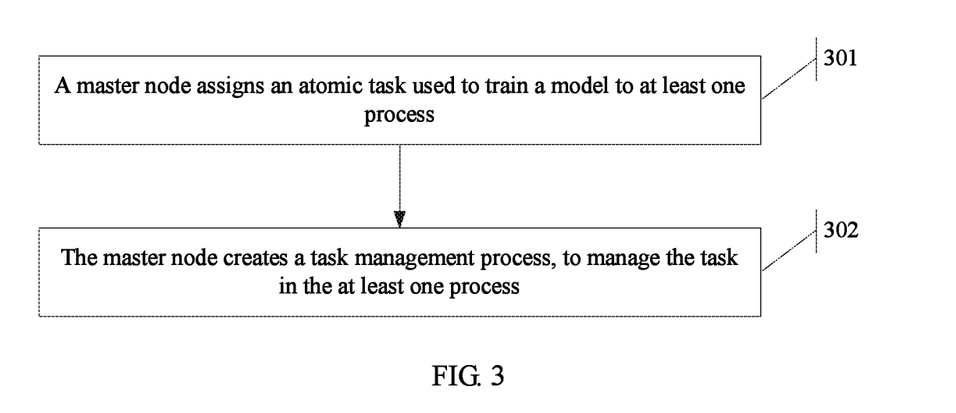
FIG. 3 is a flowchart of a second model training method according to an embodiment of the present invention.

Referring to FIG. 3, FIG. 3 shows another model training method in a distributed system according to an embodiment of the present invention. Similarly, the method may be implemented by using the distributed system shown in FIG. 1A or FIG. 1B, and a procedure for the method is described below.

Step 301: A master node 101 assigns an atomic task used to train a model to at least one process, where a training task includes at least one atomic task.

Step 302: The master node 101 creates a task management process, where the task management process is used to manage the atomic task in the at least one process.

After receiving a task list sent by a client, the master node 101 may distribute atomic tasks included in the task list (for example, one model is corresponding to at least one training task, the training task may be considered as a big task, and one big task may include at least one atomic task, for example, includes five atomic tasks, and when all the five atomic tasks are completed, it is considered that the big task is completed) to a plurality of task queues. The task queues may be generated after the master node 101 receives the task list, or may be generated before the master node 101 receives the task list. Each task queue may use, for example, a first in first out (FIFO) rule. In this case, when placing the atomic tasks into the task queues, the master node 101 may sort the atomic tasks, for example, may sort the atomic tasks based on priorities of the atomic tasks, and may first place an atomic task with a high priority into a task queue, so that the atomic task is to be executed first; or may sort the atomic tasks based on execution time of the atomic tasks, and may first place an atomic task requiring relatively long execution time into a task queue, so that the atomic task is to be executed first. In this way, a task requiring relatively long execution time or an important task can be executed first, thereby shortening execution time of an entire task, and improving model training efficiency.

Optionally, after receiving the task list sent by the client, the master node 101 may further distribute the atomic tasks to two groups of processes. One group of processes may include a single process, and the group of single processes may be used to maintain all training task identifiers (for example, the group of single processes may be corresponding to the scheduler in FIG. 1A or FIG. 1B). The other group of processes may be a multi-threaded process, and the group of multi-threaded processes may include a plurality of processes. The master node 101 may assign all atomic tasks to the group of multi-threaded processes (for example, each task queue in FIG. 1A or FIG. 1B may be corresponding to one process in the multi-threaded process, one task queue includes a plurality of atomic tasks, and an atomic task in one task queue may be processed by a corresponding process). For ease of description, the single-process group is referred to as a task management process group, and the multi-threaded process group is referred to as a task running process group.

The task management process group may maintain an identifier of each atomic task in the task running process group, and may further maintain a current status of each atomic task, for example, a state of an atomic task 1 corresponding to an identifier 1 is processed or unprocessed.

Any atomic task in the task running process group may apply to the task management process group for execution. After receiving an execution request sent by an atomic task, the task management process group may assign execution time to the atomic task requesting to be executed, and may assign a slave node 102, so as to deliver a process carrying the atomic task (that is, a process, in the task running process group, corresponding to a task queue to which the atomic task belongs) to the slave node 102 for execution, that is, to a parameter client 1021 for execution. For example, if a big task includes a plurality of atomic tasks, the atomic tasks included in the big task may be assigned to different slave nodes 102 for execution, or the atomic tasks included in the big task may be assigned to different parameter clients for execution, and each atomic task is executed by one parameter client. Therefore, it may be understood that a plurality of parameter clients are assigned a same task (that is, the big task), and different parameter clients execute different parts of the task (that is, execute different atomic tasks).

Optionally, for example, if both the atomic task 1 and an atomic task 2 in a task queue 1 in the task running process group request to be executed, after receiving execution requests sent by the atomic task 1 and the atomic task 2, the task management process group determines that the atomic task 1 is arranged ahead of the atomic task 2 in the task queue 1, and the task management process group may allow the atomic task 1 to be first executed, that is, assign execution time and a slave node (which may be understood as a parameter client) to the atomic task 1, and deliver, by using a process carrying the atomic task 1, the atomic task 1 to a parameter client for execution. In this way, the first in first out principle for a task queue is implemented.

Because one task queue is corresponding to one process, in this embodiment of the present invention, each process in the task running process group can execute only one atomic task at one moment, so that resources are effectively used, and higher execution efficiency of the atomic task is achieved.

Optionally, the task management process group may pre-estimate required execution time of an atomic task after receiving an execution request sent by the atomic task, or the task management process group may pre-estimate required execution time of each atomic task immediately after the master node assigns atomic tasks to a task queue. In this way, when an atomic task requests to be executed, the task management process group does not need to pre-estimate required execution time of the atomic task, and can assign the atomic task for execution as soon as possible, thereby improving execution efficiency. Certainly, if the master node sorts a plurality of atomic tasks based on execution time of the atomic tasks when the master node assigns the atomic tasks to the task queue, obviously, the task management process group needs to pre-estimate required execution time of each atomic task immediately after the master node assigns the atomic tasks to the task queue.

Optionally, the task management process group may pre-estimate approximate execution time of each atomic task by using a weighed evaluation algorithm.

Optionally, after processing an atomic task, a slave node may report a processing result to the master node 101 (for example, after processing an atomic task, a parameter client may report this to the master node 101 by using a parameter server, or may directly report this to the master node 101), and the master node 101 may update a status of the atomic task in the task management process group, for example, may update the status of the atomic task from unprocessed to processed. When processing an execution request sent by an atomic task, the task management process group may preferentially process an execution request sent by an unprocessed atomic task.

Currently, to implement task parallel, the atomic tasks are assigned to different processes for execution. Because the atomic tasks may be assigned randomly, atomic tasks in some processes may be completed first, and atomic tasks in some processes may be completed later. The processes in which the atomic tasks are first completed frequently steal tasks from the processes in which the atomic tasks are not completed. This causes frequent scheduling between processes, brings relatively large performance overheads, and leads to a deadlock risk due to resource preemption between the processes. In this embodiment of the present invention, the task management process is group used to perform centralized scheduling, so that each process works under scheduling, and a process in which a task is first completed does not steal an atomic task from another process, thereby effectively resolving an inter-process preemption problem, reducing performance overheads, and avoiding a deadlock risk.

The following describes an apparatus in an embodiment of the present invention with reference to the accompanying drawings.

Optionally, based on a same inventive concept, an embodiment of the present invention provides a computing node in a distributed system. The computing node may be, for example, any slave node 102 in FIG. 1A or FIG. 1B, and the computing node may perform the functions described in FIG. 2 and FIG. 3.

Figure 4:
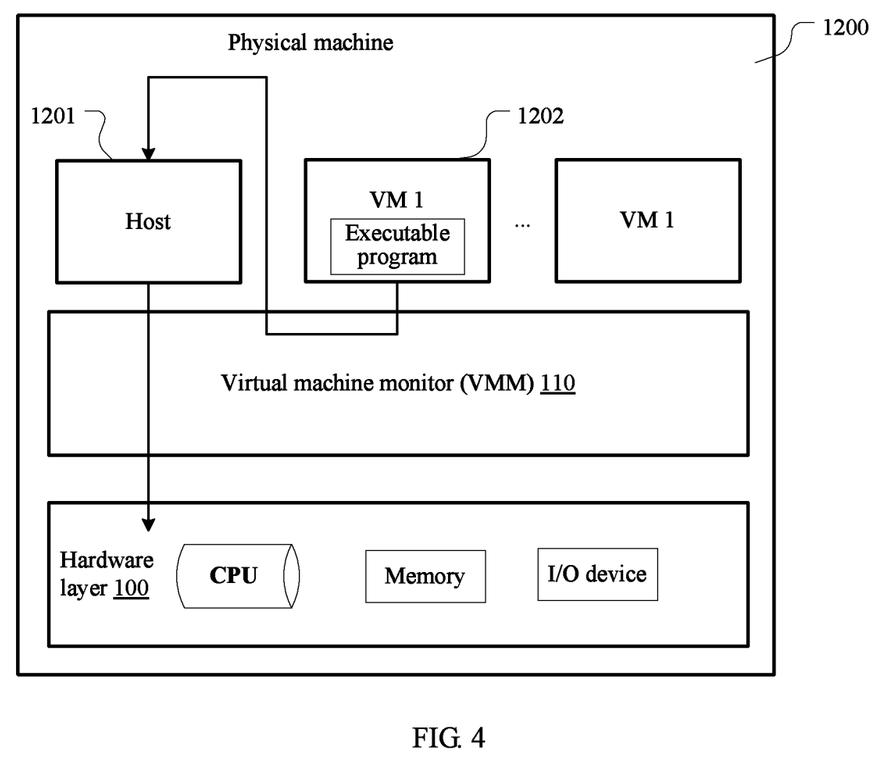
FIG. 4 is a schematic diagram of an implementation of a slave node according to an embodiment of the present invention.

In an embodiment, the computing node may be a physical machine. As shown in FIG. 4, a physical machine 1200 includes a hardware layer 100, a VMM (Virtual Machine Monitor, virtual machine monitor) 110 running on the hardware layer 100, and a host machine host 1201 and a plurality of virtual machines (VMs) that are running on the VMM 110. The hardware layer includes but is not limited to an I/O device, a CPU, and a memory. A parameter server and a parameter client in the computing node each may be a virtual machine in the physical machine 1200, for example, a VM 1202; or the parameter server and the parameter client may be implemented by using different processes or threads running on a same virtual machine. Specifically, a VM 1202 runs an executable program, and during a running process of the program, calls hardware resources of the hardware layer 100 by using the host machine host 1201, so as to implement functions of the parameter client and the parameter server described in the foregoing embodiments.

Figure 5:
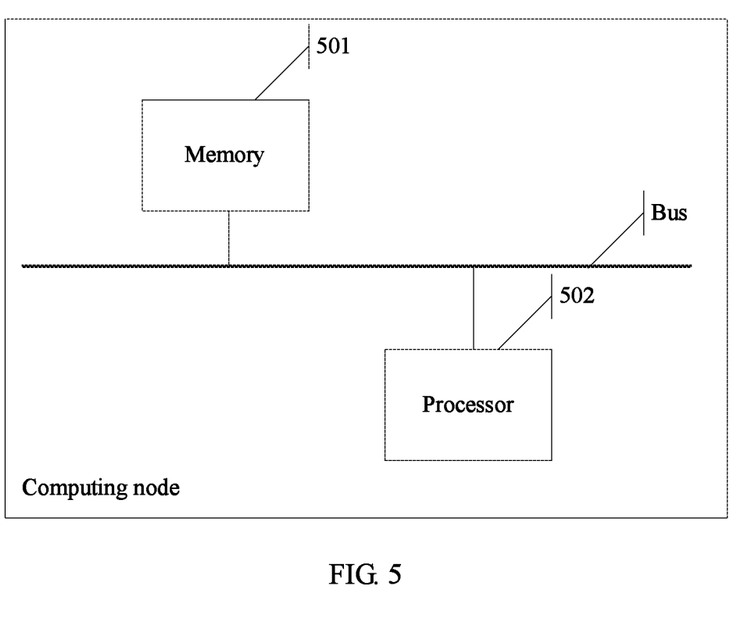
FIG. 5 is a schematic diagram of an implementation of a master node according to an embodiment of the present invention.

In another embodiment, referring to FIG. 5, the computing node may include a memory 501 and a processor 502.

The processor 502 may be a CPU or an ASIC, may be one or more integrated circuits configured to control execution of a program, may be a hardware circuit developed by using an FPGA, or may be a baseband chip.

There may be one or more memories 501. The memory 501 may include a read-only memory (ROM), a random access memory (RAM), and a magnetic disk storage.

These memories 501 may be connected to the processor 502 by using a bus (this is used as an example in FIG. 5), or may be connected to the processor 502 by using a dedicated connection cable.

Code corresponding to the method shown in the foregoing embodiments is incorporated into a chip through design and programming on the processor 502, so that the chip can perform the methods shown in FIG. 2 and FIG. 3 during running. How to perform design and programming on the processor 502 is a technology well known by a person skilled in the art, and is not described herein.

In the embodiments of the present invention, the parameter server and the parameter client may be disposed in the slave node. The parameter client is configured to perform the training process, the parameter server may update the sub-models, and the master node only needs to split the model and assign the sub-models obtained after splitting to a plurality of parameter servers. Then, the plurality of parameter servers may update the sub-models separately, which is equivalent to that the master model is updated. In this way, model updating work has been shifted from the master node to the plurality of parameter servers, thereby significantly reducing a workload of the master node. In addition, each parameter server may implement updating of only some sub-models, and load of each parameter server is not quite heavy. This well prevents a model updating process from becoming a bottleneck of an entire training process, and improves model training efficiency.

In the present invention, it should be understood that the disclosed device and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. A part or all of the units may be selected according to an actual requirement to achieve the embodiments of the present invention.

Functional units in the embodiments of the present invention may be integrated into one processing unit, or each unit may be an independent physical module.

When the integrated unit is implemented in the form of a software functional unit and sold or used as an independent product, the integrated unit may be stored in a computer-readable storage medium. Based on such an understanding, all or a part of technical solutions of the present invention may be implemented in a form of a computer software product. The software product is stored in a storage medium and includes several instructions for instructing a computer device (which may be a personal computer, a server, a network device, or the like) or a processor to perform all or a part of the steps of the methods described in the embodiments of the present invention. The foregoing storage medium includes any medium that can store program code, such as a Universal Serial Bus (USB) flash drive, a removable hard disk, a ROM, a RAM, a magnetic disk, or an optical disc.

The foregoing embodiments are merely used to describe the technical solutions of the present invention. The foregoing embodiments are merely intended to help understand the method of the embodiments of the present invention, and shall not be construed as a limitation on the embodiments of the present invention. Any variation or replacement readily figured out by a person skilled in the art within the technical scope shall fall within the protection scope of the embodiments of present invention.

What is claimed is:

1. A method for training a model in a distributed system, comprising:
   receiving, by a first parameter server in a first slave node of the distributed system, a first training result from a first parameter client in the first slave node and a second training result from a second parameter client in a second slave node in the distributed system, wherein the first training result is obtained by performing at least one round of training on a sub-model stored on the first parameter server in the first slave node, wherein the second training result by is obtained by performing at least one round of training on a sub-model stored on a second parameter server in the second slave node, wherein the distributed system comprises a master node and a plurality of slave nodes, wherein each slave node comprises at least one parameter server and at least one parameter client, and wherein each parameter server stores a sub-model of the model; and
   updating, by the first parameter server in the first slave node based on the first training result and the second training result, the sub-model stored on the first parameter server in the first slave node to obtain an updated sub-model.

2. The method according to claim 1, further comprising:
   sending, by the first parameter server in the first slave node to the second parameter client in the second slave node, a parameter corresponding to the updated sub-model;
   using, by the second parameter client in the second slave node, the parameter corresponding to the updated sub-model to perform subsequent training on the sub-model stored on the second parameter server in the second slave node.

3. The method according to claim 1, further comprising:
   determining, by the first parameter client in the first slave node, a difference between a sequence number of a current round of training being performed by a parameter client with a lowest training speed in the distributed system and K when the first parameter client in the first slave node completes a $K^{th}$ round of training, wherein K is a positive integer;
   switching, by the first parameter client in the first slave node, from a working state to a waiting state when the difference is greater than a preset difference; and
   switching, by the first parameter client in the first slave node, from the waiting state to the working state when the difference is less than or equal to the preset difference.

4. The method according to claim 3, wherein the switching, by the first parameter client in the first slave node, from the waiting state to the working state comprises:
   starting, by the first parameter client in the first slave node, a $(K+1)^{th}$ round of training; or
   sending, by the first parameter client in the first slave node, a training result obtained through the $K^{th}$ round of training to the first parameter server in the first slave node; and
   using, by the first parameter server in the first slave node, the training result obtained through the $K^{th}$ round of training to update the sub-model stored on the first parameter server in the first slave node.

5. The method according to claim 1, wherein one parameter server corresponds to at least one parameter client, and wherein a parameter server and a parameter client correspond to each other are located in the same slave node.

6. The method according to claim 1, wherein a quantity of sub-models stored across the distributed system is the same as a quantity of parameter servers in the distributed system.

7. A computing node in a distributed system, comprising:
   a first parameter server configured to store a sub-model of a model, wherein the sub-model is obtained by splitting the model, wherein the sub-model stored on the first parameter server is different from a sub-model stored on a second parameter server in another computing node in the distributed system wherein the distributed system comprises a master node and a plurality of slave nodes, and wherein each slave node comprises at least one parameter server and at least one parameter client; and
   a first parameter client configured to perform at least one round of training on the sub-model stored on the first parameter server to obtain a first training result of the sub-model,
   wherein the first parameter server is further configured to:
      receive the first training result and a second training result from a second parameter client in the other computing node; and
      update the first sub-model stored on the first parameter server based on the first training result and the second training result to obtain an updated sub-model.

8. The computing node according to claim 7, wherein the first parameter server is further configured to send, to the second parameter client in the other computing node, a parameter corresponding to the updated sub-model, wherein the parameter is used by the second parameter client in the other computing node to perform subsequent training on a sub-model stored on the second parameter server in the other computing node.

9. The computing node according to claim 7, wherein the second training result is obtained by the second parameter client in the other computing node by performing at least one round of training on a sub-model stored on the second parameter server in the other computing node.

10. The computing node according to claim 7, wherein after completing a $K^{th}$ round of training, the first parameter client is further configured to:
   determine a difference between a sequence number of a current round of training being performed by a parameter client with a lowest training speed in the distributed system and K, wherein K is a positive integer;
   switch from a working state to a waiting state when the difference is greater than a preset difference; and switch from the waiting state to the working state when the difference is less than or equal to the preset difference.

11. The computing node according to claim 10, wherein the first parameter client is further configured to start a $(K+1)^{th}$ round of training.

12. The computing node according to claim 10, wherein the first parameter client is further configured to:
send a training result obtained through the $K^{th}$ round of training to the first parameter server; and
using, by the first parameter server, the training result obtained through the $K^{th}$ round of training to update the sub-model stored on the first parameter server in the computing node.

13. A distributed system for training a model, comprising:
a master node configured to split the model into a plurality of sub-models; and
a plurality of slave nodes, wherein each slave node comprises at least one parameter server and at least one parameter client, wherein each parameter server stores a sub-model of the model, wherein the plurality of slave nodes comprises a first slave node and a second slave node, wherein a second parameter client in the second slave node is configured to:
perform at least one round of training on a sub-model stored on a second parameter server in the second slave node to obtain a second training result, and
send the second training result to a first parameter server in the first slave node,
wherein the first parameter server in the first slave node is configured to:
obtain a first training result by performing at least one round of training on a sub-model stored on the first parameter server in the first slave node; and
update the sub-model stored on the first parameter server based on the first training result and the second training result to obtain an updated sub-model.

14. The distributed system according to claim 13, wherein one parameter server corresponds to at least one parameter client, and wherein a parameter server and a parameter client that correspond to each other are located in the same slave node.

15. The distributed system according to claim 13, wherein the first parameter server in the first slave node is further configured to send a parameter corresponding to the updated sub-model to the second parameter client in the second slave node, and wherein the second parameter client in the second slave node is further configured to perform subsequent training on the sub-model stored on the second parameter server in the second slave node using the parameter.

16. The distributed system according to claim 13, wherein the first parameter client in the first slave node is further configured to:
determine a difference between a sequence number of a current round of training being performed by a parameter client with a lowest training speed in the distributed system and K after completing a $K^{th}$ round of training, wherein K is a positive integer;
switch from a working state to a waiting state when the difference is greater than a preset difference; and
switch from the waiting state to the working state when the difference is less than or equal to the preset difference.

17. The distributed system according to claim 16, wherein the first parameter client in the first slave node is further configured to start a $(K+1)^{th}$ round of training.

18. The distributed system according to claim 16, wherein the first parameter client in the first slave node is further configured to send a training result obtained through the $K^{th}$ round of training to the first parameter server in the first slave node, and wherein the first parameter server in the first slave node is configured to use the training result obtained through the $K^{th}$ round of training to update the sub-model stored on the first parameter server in the first slave node.

* * * * *